United States Patent [19]

Markyvech et al.

[11] Patent Number: 5,489,247
[45] Date of Patent: Feb. 6, 1996

[54] ADAPTIVE SHIFT CONTROL METHOD/SYSTEM FOR MODIFYING ENGINE DELAY RATE OR VEHICLE COAST DECELERATION DURING UPSHIFTS

[75] Inventors: Ronald K. Markyvech, Allen Park; Roger A. Graves, Jr., Battle Creek, both of Mich.

[73] Assignee: Eaton Corporation, Cleveland, Ohio

[21] Appl. No.: 226,749

[22] Filed: Apr. 12, 1994

Related U.S. Application Data

[63] Continuation-in-part of Ser. No. 909,332, Jul. 6, 1992, Pat. No. 5,335,566.

[51] Int. Cl.⁶ .......................... B60K 41/08; F16H 59/48
[52] U.S. Cl. .............................. 477/120; 477/904
[58] Field of Search .................. 74/335; 477/120, 477/124, 904

[56] References Cited

U.S. PATENT DOCUMENTS

| | | | |
|---|---|---|---|
| 4,361,060 | 11/1982 | Smyth | 477/78 |
| 4,595,986 | 7/1986 | Daubenspeck et al. | 364/424.1 |
| 4,648,290 | 3/1987 | Dunkley et al. | 477/78 |
| 5,053,959 | 10/1991 | Genise | 74/335 |
| 5,053,961 | 10/1991 | Genise | 364/424.1 |
| 5,053,962 | 10/1991 | Genise | 364/424.1 |
| 5,089,965 | 2/1992 | Braun | 364/424.1 |
| 5,133,229 | 7/1992 | Asada et al. | 364/424.1 |
| 5,172,609 | 12/1992 | Nitz et al. | 477/97 |
| 5,231,582 | 7/1993 | Takahashi et al. | 364/424.1 |
| 5,231,897 | 8/1993 | Morita | 477/120 |
| 5,241,476 | 8/1993 | Benford et al. | 477/120 X |
| 5,272,939 | 12/1993 | Markyvech et al. | 477/120 |
| 5,335,566 | 8/1994 | Genise et al. | 477/904 X |

*Primary Examiner*—Khoi Q. Ta
*Attorney, Agent, or Firm*—Howard D. Gordon

[57] ABSTRACT

An adaptive control system/method for an at least partially automated mechanical transmission system (10) is provided for determining if selected upshifts into a target gear ratio are feasible (208) or not feasible (210) under current vehicle operating conditions and for prohibiting the initiation of not feasible selected upshifts. If upshifts determined to be feasible are not completed by the system, the logic rules by which upshift feasibility is determined are modified to render such rules less aggressive.

14 Claims, 7 Drawing Sheets

ADAPTIVE SHIFT CONTROL METHOD/SYSTEM FOR MODIFYING ENGINE DELAY RATE OR VEHICLE COAST DECELERATION DURING UPSHIFTS

Related Applications

This application is a continuation-in-part of application, U.S. Ser. No. 07/909,332, entitled SHIFT CONTROL METHOD/SYSTEM, filed Jul. 6, 1992, now U.S. Pat. No. 5,335,566 and assigned to the same assignee, EATON CORPORATION, as is this application.

BACKGROUND OF THE INVENTION

This application is related to U.S. Ser. No. 08/179,060, entitled ENGINE BRAKE ENHANCED UPSHIFT CONTROL METHOD/SYSTEM, filed Jan. 7, 1994, now U.S. Pat. No. 5,425,689 and assigned to the same assignee, EATON CORPORATION, as is this application.

This application is related to U.S. Ser. No. 08/192,522, entitled METHOD/SYSTEM TO DETERMINE GROSS COMBINATION WEIGHT OF VEHICLES, filed Feb. 7, 1994, and assigned to the same assignee, EATON CORPORATION, as is this application.

1. Field of Invention

This invention relates to shift control methods/systems for at least partially automated vehicular mechanical transmission systems wherein the probabilities of successfully completing a selected upshift are evaluated in view of existing vehicle operating conditions, including the expected deceleration of the vehicle and the vehicle engine, and only shifts deemed to be feasible are initiated. In particular, the present invention relates to an adaptive shift control method/system that will respond to the occurrence of system inability to complete an upshift determined to be feasible by, at least temporarily, modifying the logic rules by which expected feasibility of subsequent selected upshifts is determined.

More particularly, the present invention relates to an adaptive shift control for automated mechanical transmission systems which will respond to an inability to complete a selected upshift determined to be feasible by, at least temporarily, modifying the logic rules by which subsequent selected upshift feasibility is determined to cause a less aggressive determination of feasibility. Preferably, the logic rules, at least temporarily, are modified to decrease the engine rotational deceleration and/or increase the vehicle acceleration control parameter values used to determine upshift feasibility.

2. Description of the Prior Art

Fully automatic transmission systems, both for heavy-duty vehicles, such as heavy-duty trucks, and for automobiles, that sense throttle openings or positions, transmission shaft speeds, vehicle speeds, engine speeds, and the like, and automatically shift the vehicle transmission in accordance therewith, are well known in the prior art. Examples of such transmissions may be seen by reference to U.S. Pat. Nos. 3,961,546; 4,081,065 and 4,361,060, the disclosures of which are incorporated herein by reference.

Semi-automatic transmission systems utilizing electronic control units which sense engine fueling, throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic mechanical transmission systems may be seen by reference to U.S. Pat. Nos. 4,425,620; 4,631,679 and 4,648,290, the disclosures of which are incorporated herein by reference.

Another type of partially automated vehicular transmission system utilizes an automatic or semi-automatic shift implementation system/method for a mechanical transmission system for use in vehicles having a manually only controlled engine throttle means and/or a manually only controlled master clutch. The system usually has at least one mode of operation wherein the shifts to be automatically or semi-automatically implemented are automatically preselected. An electronic control unit (ECU) is provided for receiving input signals indicative of transmission input and output shaft speeds and/or engine speed and for processing same in accordance with predetermined logic rules to determine (i) if synchronous conditions exist, and (ii) in the automatic preselection mode, if an upshift or downshift from the currently engaged ratio is required and to issue command output signals to a transmission actuator and/or an engine fuel controller for shifting the transmission in accordance with the command output signals.

Transmission systems of this general type may be seen by reference to U.S. Pat. Nos. 5,050,079; 5,053,959; 5,053,961; 5,053,962; 5,063,511; 5,081,588; 5,089,962; 5,089,965 and 5,272,939, the disclosures of which are incorporated herein by reference.

While the above-described automatic and/or partially automatic shift implementation type vehicular mechanical transmission systems are well suited for their intended applications, they are not totally satisfactory as they will occasionally initiate an attempted shift, which, due to vehicle operating conditions, cannot be completed. This is especially a concern for upshifts of those automated mechanical transmission systems not provided with an automated clutch actuator and/or an input shaft brake and thus have input shaft deceleration limited to the normal or engine brake-assisted decay rate of the engine without the benefit of an input shaft brake.

In accordance with the inventions of aforementioned co-pending U.S. Ser. No. 08/179,060 and U.S. Pat. No. 5,272,939, the above-discussed drawbacks of the prior art are minimized or overcome by the provision of a shift control method/system for a vehicular at least partially automated mechanical transmission system which, upon sensing an automatic or manual selection of an upshift from a currently engaged gear ratio into a target gear ratio will, based upon currently sensed vehicle operating conditions, determine if the selected upshift is feasible (i.e., probably completible) and only initiate feasible shifts.

A criticism of certain less than fully automated mechanical transmission systems (such as transmission systems without automatic master clutch control and/or input shaft brakes) is that under certain conditions they may not be able to complete some shifts they start (i.e., on a grade, low-gear shifts, etc.). However, a transmission system does not have to be able to make all shifts under all conditions, it just needs to be smart enough to know not to start a shift it cannot finish. The transmission control, prior to initiation of an upshift, will make a simple passive test for shiftability and requests for non-feasible upshifts are either modified or cancelled.

Upon selection of an upshift from a currently engaged ratio to a target ratio (usually as a function of engine fueling, throttle position, engine speed, vehicle speed and/or currently engaged ratio) vehicle reaction to a torque break shift transient is predicted, usually on the basis of an assumed or determined vehicle gross combined weight (GCW), and vehicle speed during the shift transient into the target ratio is estimated and compared to expected engine speed (equals input shaft speed and is a function of engine deceleration) during the proposed shift transient to determine if the proposed shift is feasible (i.e., can substantial synchronous be achieved?).

If the proposed upshift is not feasible, the shift request may be modified (i.e., a skip shift request changed to single shift) or cancelled for a predetermined period of time (such as 10 seconds).

Assuming a vehicle equipped with an electronic data link, such as defined in SAE J 1922 and/or J 1939 protocol, on which engine torque or a parameter indicative of engine torque may be sensed, or alternatively, a throttle position sensor, upon determination that an upshift from a currently engaged ratio into a target ratio is desired, parameters indicative of current engine torque and vehicle speed or acceleration are sensed, from which the controller can estimate vehicle GCW and deceleration at zero torque (i.e., during a shift transient). The system then proceeds to determine if the proposed shift is feasible utilizing the logic discussed above.

The foregoing logic was not totally satisfactory, as under certain, often temporary, conditions, the feasibility determination logic tended to be overly aggressive for existing vehicle operating conditions. For example, if values were filtered by a 95-percent filter (i.e., control parameter value equals 0.05 (current value determination) plus 0.95 (previous control parameter value)), temporary operating conditions, such as heading into a strong headwind, might not be immediately sensed. Also, temporary or long-term deviations of control parameters, such as engine deceleration, from assumed values therefor were not accounted for.

SUMMARY OF THE INVENTION

In accordance with the present invention, the drawbacks of the prior art are minimized or overcome by the provision of an adaptive upshift control for an at least partially automated vehicular mechanical transmission system which determines feasibility of selected upshifts, initiates only those selected upshifts determined to be feasible, and responds to system inability to complete an attempted upshift determined to be feasible by modifying, at least temporarily, the logic rules by which upshift feasibility is determined. The modification to the logic rules is such that upshift feasibility is rendered less aggressive (i.e., stricter requirements are set for a determination of feasibility of a selected upshift).

In a preferred embodiment of the present invention, the above is accomplished in a vehicular automated mechanical transmission system control of the type having upshift feasibility determination, upon sensing inability to complete an upshift determined to be feasible, by modifying the feasibility determination logic for subsequent upshift evaluation by decreasing the effective value of the parameter indicative of engine deceleration and/or increasing the effective value of the parameter indicative of vehicle deceleration by a predetermined amount (for example, by about 6 percent), which will result in less aggressive determination of feasibility. In practice, by way of example, decreasing the value of the parameter indicative of vehicular GCW, the value of the parameter indicative of vehicle deceleration will increase as, due to lower inertia, a lighter vehicle will decelerate quicker than a heavier vehicle under zero drive torque conditions. These modifications to the feasibility logic rules may be permanent, permanent until the next vehicle start-up, expire after a predetermined time period or gradually diminish as the result of a filtering operation or the like.

Accordingly, an adaptive control system/method for a vehicular at least partially automated mechanical transmission system is provided which will prohibit initiation of a selected upshift not deemed feasible and which will adaptively modify the logic rules by which upshift adaptability is determined if the system if unable to complete upshifts determined to be feasible.

This and other objects and advantages of the present invention will become apparent from a reading of the detailed description of the preferred embodiment taken in connection with the attached drawings.

DESCRIPTION OF THE PREFERRED EMBODIMENT

Figure 1:
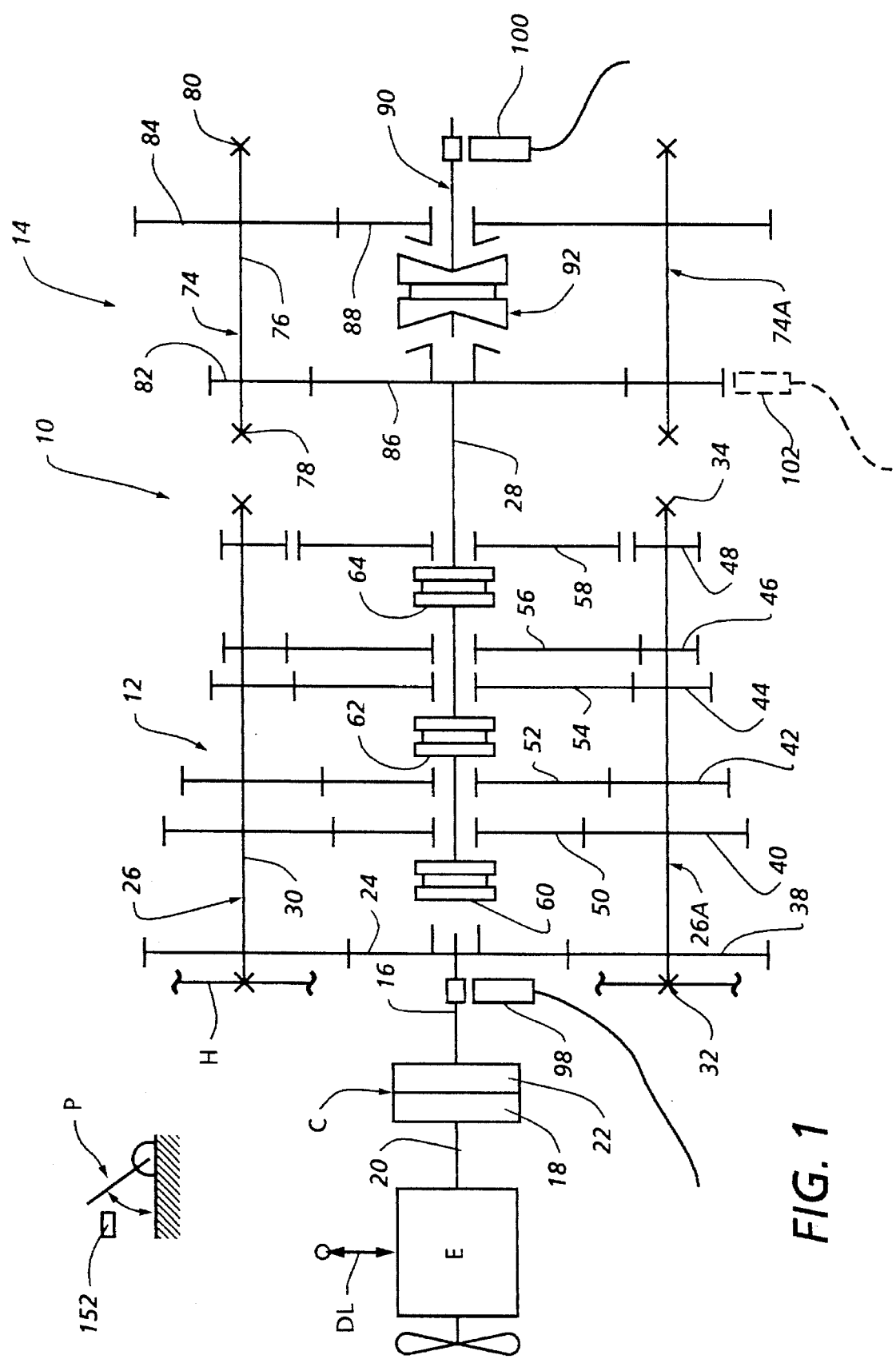
FIG. 1 is a schematic illustration of the vehicular mechanical transmission system partially automated by the system of the present invention.
Figure 3:
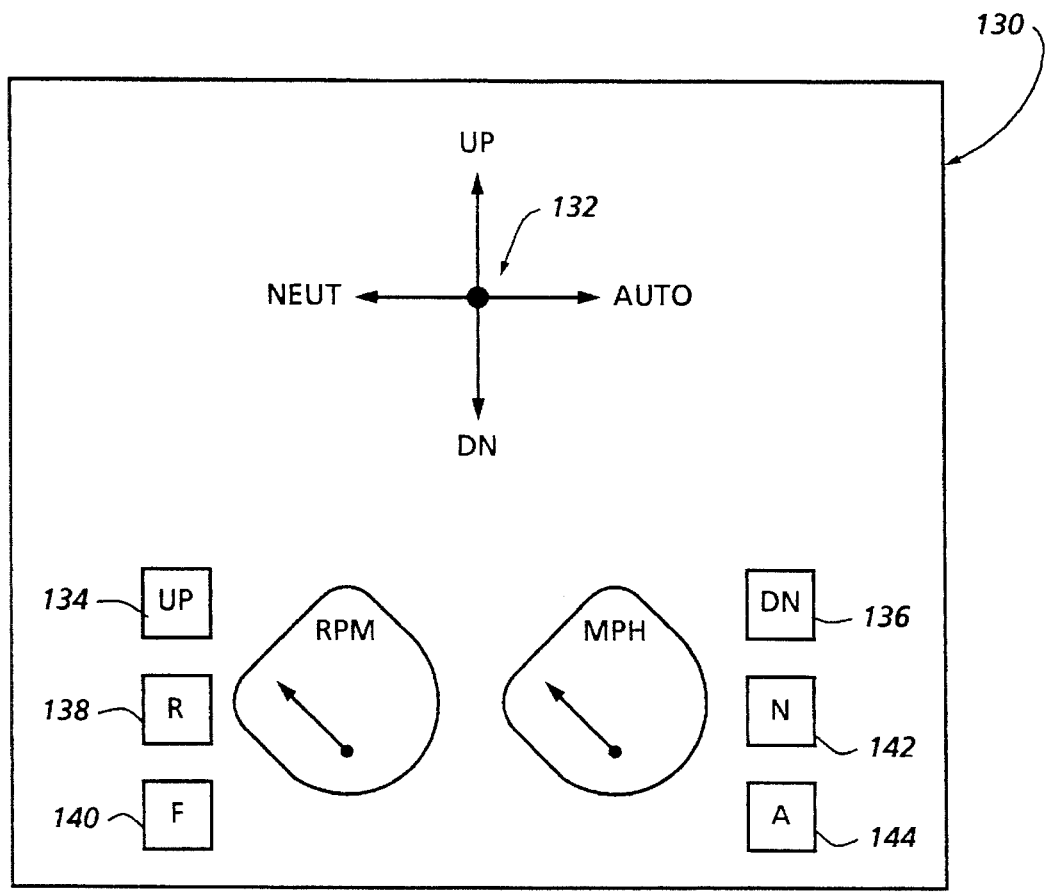
FIG. 3A is a schematic illustration of logic for differentiating signals representative of current vehicle and engine speed.
FIG. 3B is a schematic illustration of logic for calculating an expected vehicle acceleration during the shift transient when zero engine torque is applied to the drive wheels.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

Referring to FIG. 1, a range-type compound transmission 10 of the type at least partially automated by a semi-automatic mechanical transmission system having an automatic preselect mode of operation is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and is connected to an electronic data link DL of the type defined in SAE J 1922 or J 1939 protocol, and the master clutch C is manually controlled by a clutch pedal (not shown) or the like. An input shaft brake (not shown), operated by manual overtravel depression of the clutch pedal, may be provided to provide quicker manual upshifting as is well known in the prior art.

Transmissions similar to mechanical transmission 10 are well known in the prior art and may be appreciated by reference to U.S. Pat. Nos. 3,105,395; 3,283,613 and 4,754, 665, the disclosures of which are incorporated by reference.

Partially automated vehicular mechanical transmission systems of the type illustrated may be seen by reference to above-mentioned U.S. Pat. Nos. 5,050,079; 5,053,959; 5,053,961; 5,053,962; 5,063,511; 5,089,965 and 5,272,939.

Although the control method/system of the present invention is particularly useful for those automated mechanical transmission systems not having automatic clutch actuators or input shaft brakes, the present invention is not limited to such use.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237; 4,873,881; 4,928,544 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

Figure 1A:
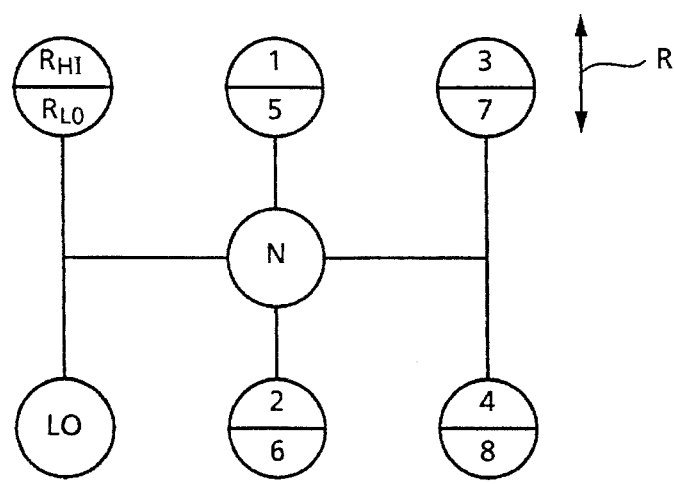
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are incorporated herein by reference.

Although the range-type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type.

For purposes of providing the automatic preselect mode of operation and the automatic or semi-automatic shift implementation operation of transmission 10, an input shaft speed (IS) sensor and an output shaft speed (OS) sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90. Further, with main clutch C fully engaged, input shaft speed (IS) will equal engine speed (ES).

Figure 2:
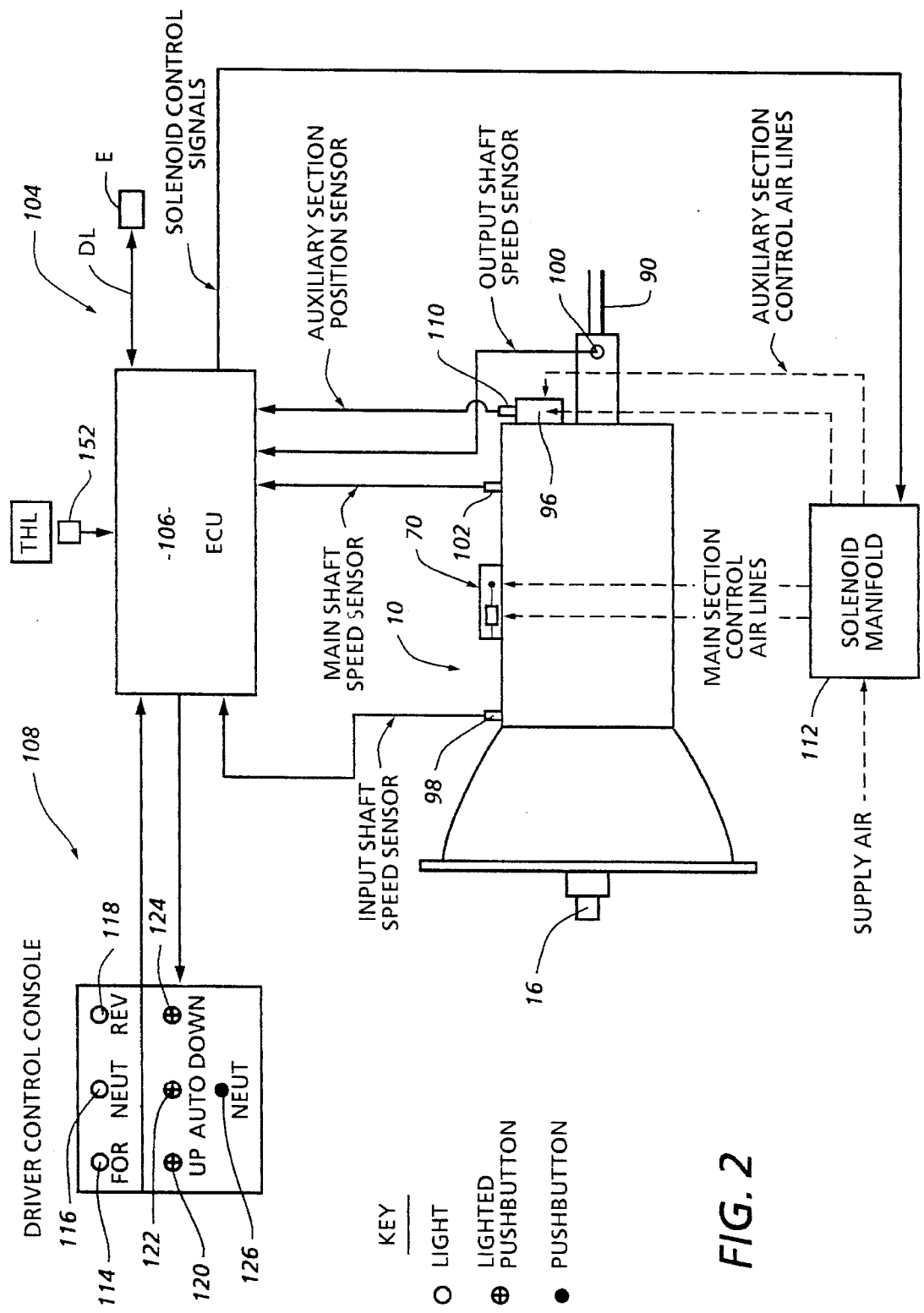
FIG. 2 is a schematic illustration of the automatic preselect and semi-automatic shift implementation system for a mechanical transmission system of the present invention.

The automatic preselect and automatic or semi-automatic shift implementation control system 104 for a mechanical transmission system of the present invention is schematically illustrated in FIG. 2. Control system 104, in addition to the mechanical transmission 10 described above, includes an electronic control unit 106, preferably microprocessor based, for receiving input signals, from the input shaft speed sensor 98, from the output shaft speed sensor 100 (or, alternatively, the mainshaft speed sensor 102) and from the driver control console 108 from a throttle pedal P position sensor 152 and from the engine E though data link DL. The ECU 106 may also receive inputs from an auxiliary section position sensor 110.

The ECU 106 may be of the type illustrated in U.S. Pat. No. 4,595,986, the disclosure of which is incorporated herein by reference. The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108, and through the data link DL to engine E.

In the preferred embodiment, the driver control counsel allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection is made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Alternatively, at a given engine speed (ES) (such as above 1700 RPM), the upshift button may be lit and remain lit until an upshift is selected by pushing the button.

To implement a selected shift, the manifold 112 is preselected to cause actuator 70 to be biased to shift main transmission section 12 into neutral. This is accomplished by the operator or the ECU controller causing a torque reversal by manually momentarily decreasing and/or increasing the supply of fuel to the engine and/or manually or automatically disengaging the master clutch C. See U.S. Pat. No. 4,850,236, the disclosure of which is incorporated herein by reference. As the transmission is shifted into neutral, and neutral is verified by the ECU (neutral sensed for a period of time such as 1.5 seconds), the neutral condition indicia button 116 is lighted. If the selected shift is a compound shift, i.e., a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged ($GR_{TARGET}$), which will result in an acceptably synchronous engagement of the ratio to be engaged. As the operator or the ECU, by throttle manipulation, causes the input shaft speed to fall within the acceptable range, the ECU 106 will issue command output signals to manifold 112 to cause actuator 70 to engage the mainsection ratio to be engaged.

In the automatic preselection mode of operation, selected by use of lighted pushbutton 122, the ECU will, based upon stored logic rules, currently engaged ratio (which may be calculated by comparing input shaft to output shaft speed), output shaft or vehicle speed and/or throttle pedal position determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode and the shift preselected thereby by depression of pushbutton 122.

Under certain operating conditions of the vehicle, an automatically or manually selected shift may not be completable. These conditions usually involve upshifts when the vehicle is heavy loaded and/or is traveling against a great resistance, such as in mud, up a steep grade and/or into a strong headwind. To achieve substantial synchronous conditions to complete an upshift, the speed of the input shaft 10 (which substantially equals the speed of the engine E with the master clutch engaged) must be lowered to substantially equal the speed of the output shaft 90 (directly proportional to vehicle speed) multiplied by the target gear ratio. As an automated clutch actuator and input shaft brake are not provided, the speed of the input shaft will decrease with the rate of decay of engine speed. Thus, to achieve substantially synchronous conditions for engagement of the target ratio, IS should substantially equal OS*GR$_{TARGET}$ and, with the master clutch fully engaged, IS will substantially equal ES.

Figure 5:
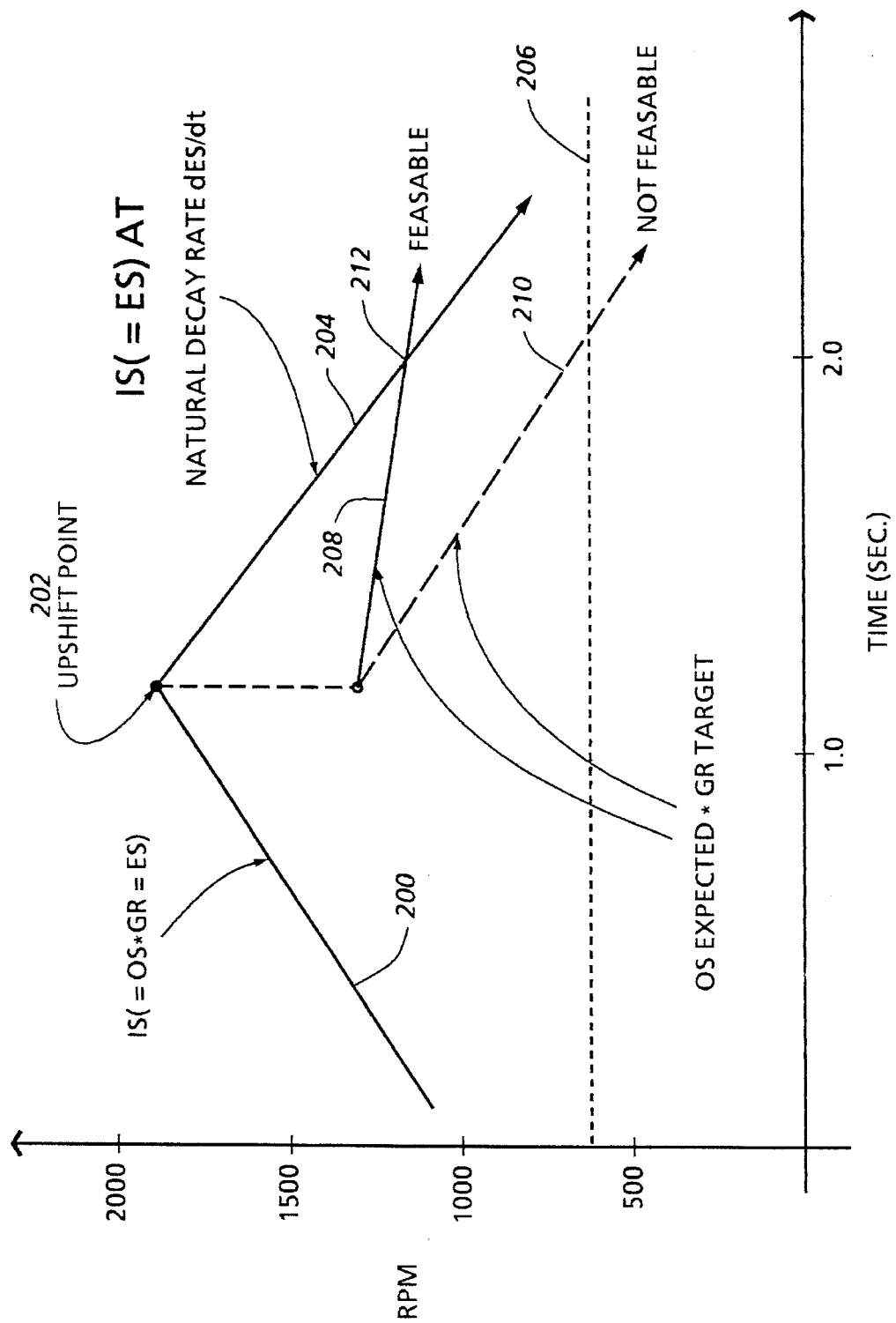
FIG. 5 is a graphical representation of an upshift event illustrating both feasible and not feasible attempted shifts.

The sequence of an upshift of the illustrated automated mechanical transmission system is graphically illustrated in FIG. 5. Line 200 represents the input shaft speed (IS) at vehicle conditions prior to the upshift point 202 wherein the current gear ratio (GR) is fully engaged, the master clutch C is fully engaged, and ES=IS=OS*GR. As the engine is defueled (i.e., fueling of the engine is reduced to a minimum value), the input shaft speed and engine speed will decay at the constant (but not necessarily linear) rate (dIS/dt) represented by line 204 until idle speed 206 is reached. The expected speed of the output shaft 90 during the shift transient when zero engine torque is applied to the vehicle drive wheels (OS)$_{EXPECTED}$) multiplied by the target gear ratio, which product is the required synchronous speed of the input shaft/engine, is represented by lines 208 and 210 illustrating, respectively, that product at a lesser or greater resistance to motion of the vehicle. As may be seen, under conditions of lower resistance (line 208), synchronous will occur at point 212 and the selected upshift is feasible while, under conditions of greater resistance (line 210), substantial synchronous will not occur and the selected upshift is not feasible.

In a typical diesel engine of a heavy duty truck, the engine/input shaft decay rate is about 300 to 800 RPM and both the engine and vehicle deceleration may be approximated as linear. The specific rate of decay of the engine and/or input shaft may be predetermined or may be learned by differentiating the value of ES and/or IS signals during a defueling condition (see, for example, aforementioned U.S. Pat. No. 4,361,060). The decay rate, however, may have a large variation due to engine temperature and/or use of engine-driven accessories, such as air-conditioning or the like.

Figure 4B:
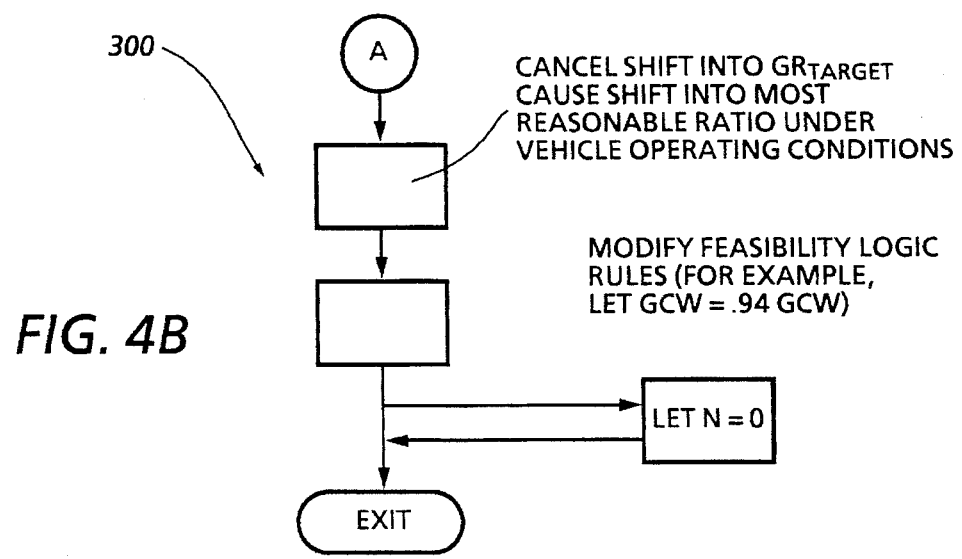
FIGS. 4A and 4B are schematic illustrations, in flow chart format, of the inventive control method of the present invention.
Figure 4A:
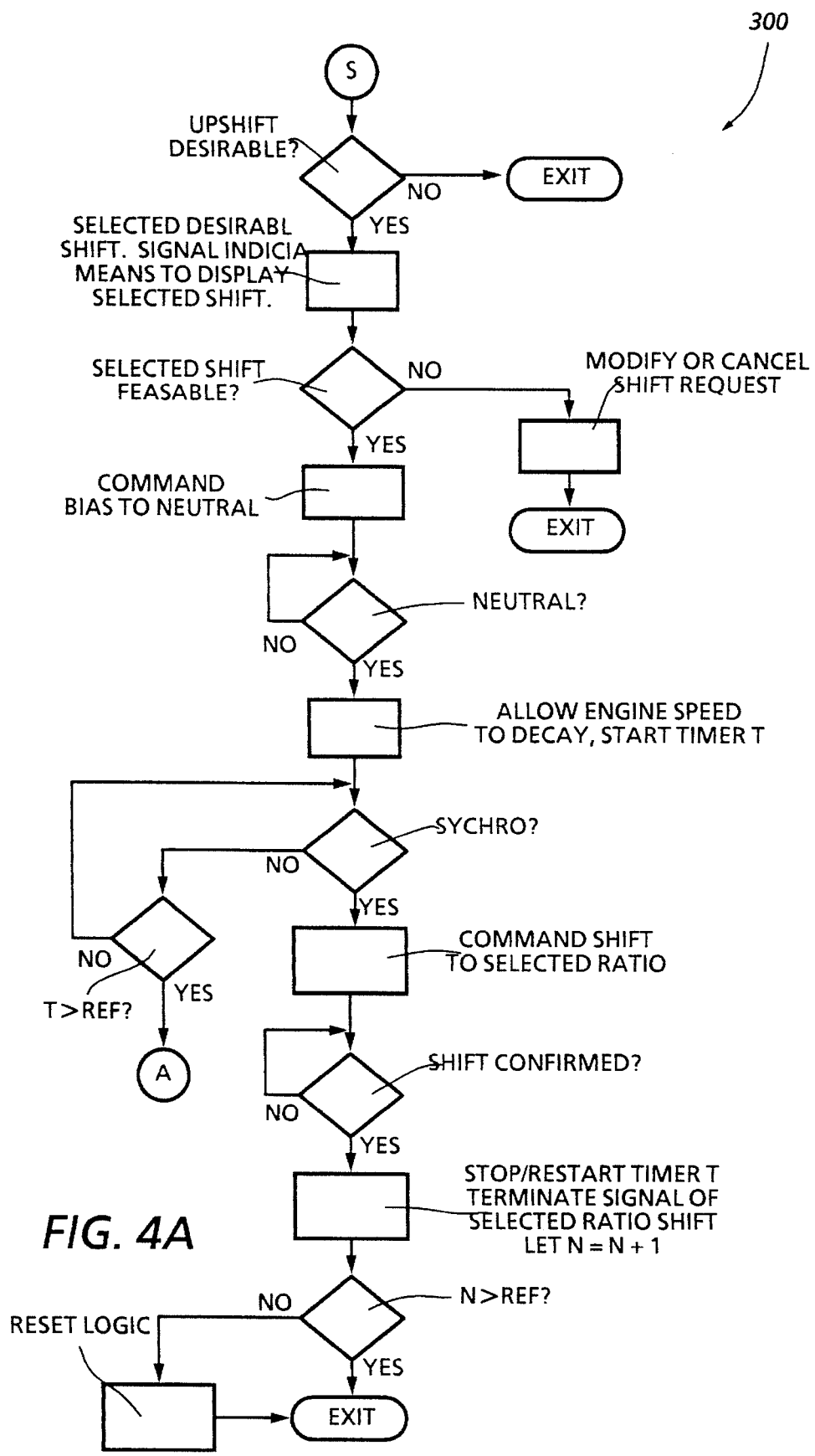

According to the upshift control method/system of the present invention, selected upshifts are evaluated, prior to initiation thereof, to determine if feasible or not feasible, and not feasible selections are either modified or cancelled. The upshift sequence according to the control systems/method of the present invention is schematically illustrated, in flow chart format, in FIGS. 4A and 4B.

The timer referred to in Flowcharts 4A and 4B may be a counter or the like if algorithm 300 is performed on a known cycle, such as once every 30-60 milliseconds.

As may be seen by reference to FIG. 5, if the input shaft speed (IS) (as determined by initial input shaft speed at point 202 and the acceleration of the input shaft (dIS/dt)) will be equal to the product of expected output shaft speed at zero torque to the vehicle drive wheels (OS$_{EXPECTED}$), which is determined by initial OS (–IS/GR) and the vehicle acceleration (dOS/dt) at current resistance to vehicle motion, multiplied by the numerical value of the target gear ratio (GR$_{TARGET}$) at a value greater than a reference (such as engine idle speed 206), then achieving a synchronous shift into the selected target gear ratio is feasible; if not, achieving a substantially synchronous shift into the selected target gear ratio is infeasible. The OS and dOS/dt signals are, of course, equivalent to vehicle speed and vehicle acceleration signals, respectively. The reference value is illustrated as engine idle speed 206 but can be a lower positive value if the master clutch is manually or automatically disengaged.

For purposes of feasibility determination, for vehicles having a widely variable gross combined weight ("GCW"), i.e., combined weight of vehicle, fuel, cargo (if any) passengers (if any) and operator, the controller will determine current GCW. From this information, the system can determine what the vehicle acceleration (usually a deceleration) will be at zero driveline torque, i.e., the slope of line 208 or 210. Based upon this information and a present or learned value of engine decay rate, i.e., the slope of line 204, which may vary with engine speed, operating temperature, operation of an engine brake, etc., the ECU can then determine if, under current vehicle operating conditions, the system is able to successfully complete the proposed upshift. Based upon this information, the control system can then either (i) issue command signals to implement the proposed upshift, or (ii) modify the proposed shift (usually command a single rather than a skip upshift, or (iii) cancel/prohibit the shift request for a predetermined period of time (such as, for example, about 10 seconds).

Briefly, the acceleration of the vehicle at zero torque to the drive wheels can be approximated by the relationship:

$$A_{o\ TORQUE} = A_i - (T_i/CW)$$

where:
  $A_i$=vehicle acceleration at engine torque i to the drive wheels,
  C=a constant,
  $T_i$=engine torque i to the drive wheels, and
  W=gross combined vehicle weight.
The above relationship is derived as follows:

$$T = C_1W + C_2V^2 + C_3G \cdot W + C_4W/g \quad (A)$$

where:
  T=engine torque
  W=gross combined vehicle weight
  V=vehicle velocity
  G=a factor proportional to grade
  A=current acceleration
  Ci=constants, related to drivetrain and engaged gear ratio
and where:
  $C_1W$ represents engine torque, delivered to the drive wheels, to overcome rolling resistance;
  $C_2V_2$ represents engine torque, delivered to the drive wheels, to overcome aerodynamic drag;
  $C_3 \cdot G \cdot W$ represents engine torque, delivered to the drive wheels, to overcome grade resistance; and
  $C_4(W/g)$ A represents engine torque, delivered to the drive wheels to achieve acceleration A A change in engine torque to the drive wheels, from $T_1$ to $T_2$, is represented:

$$T_1 - T_2 = C_1(W-W) + C_2(V_1^2 - V_2^2) + C_3G(W-W) + C_4\ W/g\ (A_1 - A_2).$$

considering that:
  W–W=0;
  $V_1^2 - V_2^2 = 0 (V_1 \approx V_2)$;
  $C = C_4/g$,
the relationship may be rewritten:
  $T_1 - T_2 = C \cdot W\ (A_1 - A_2)$, or
  $(T_1 - T_2)/(A_1 - A_2) = C \cdot W$
Setting $T_2$ equal to zero torque,
  $T_1 = C \cdot W\ (A_1 - A_0)$
  $T_1 = C \cdot W \cdot A_1 - C \cdot W \cdot A_0$
  $A_0 = (C \cdot W \cdot A_1 - T_1)/(C \cdot W)$
Preferably, gross combined weight of the vehicle is determined during previous upshift events by comparing vehicle accelerations at differing drive wheel torques. If gross vehicle weight is a known substantially constant value, such as in a bus, than the value for CW may be predetermined and memorized, which allows vehicle deceleration at zero torque under current operating conditions to be determined by sensing current engine torque ($T_1$) and vehicle acceleration ($A_1$) and solving for $A_0=A_1-(T_1/CW)$.

Figure 3A:
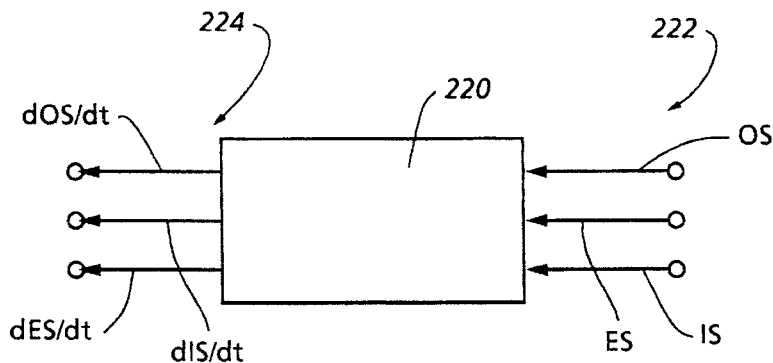

FIG. 3A schematically illustrates a logic element or subroutine 220 for differentiating various input signals 222, such as OS and/or ES, to determine the derivatives with respect to time thereof, dOS/dt and/or dES/dt, as output signals 224.

Figure 3B:
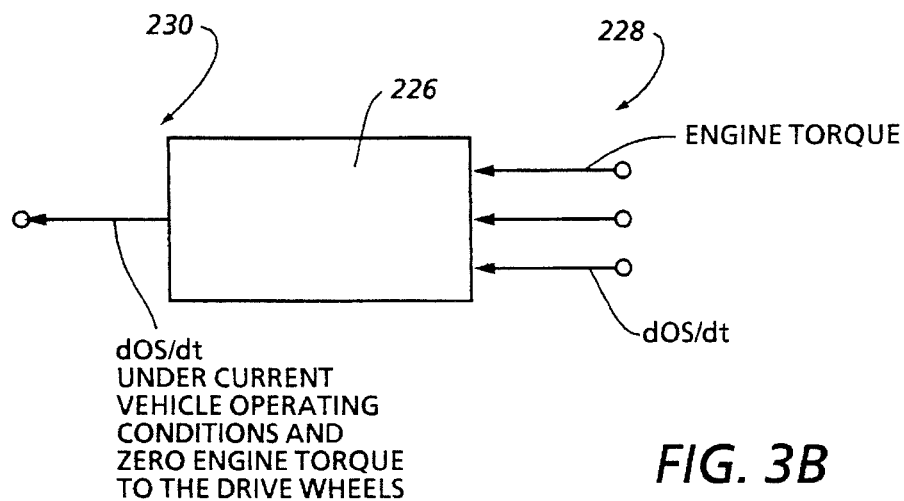

FIG. 3B schematically illustrates a logic element or subroutine 226 wherein input signals 228, including signals indicative of engine torque and vehicle acceleration (dOS/dt), are processed according to the logic rules set forth above to determine an output signal value 230 indicative of expected vehicle acceleration (dOS/dt) during the shift transient when no engine torque is applied to the vehicle drive wheels.

The display/control console also may be of the "R-N-D-H-L" (i.e., reverse-neutral-drive-hold-low) type with a manual upshift and downshift selector.

The above system automatically evaluates the feasibility, under current vehicle operating conditions, of manually or automatically preselected shifts and either causes such proposed shifts to be executed, modified or cancelled. In the event of a manually selected upshift determined to be unfeasible, the operator may be issued a tactile, audible or visual warning.

Under certain, often temporary, vehicle operating conditions, the feasibility determination logic rules may be excessively aggressive and indicate incorrectly that a selected upshift is feasible when such a shift cannot be acceptably completed (i.e., ES(=IS) cannot be made to substantially equal $OS*GR_{TARGET}$). This may occur due to error, often temporary, in determining actual current engine decay rate and/or the value of vehicle gross combined weight. Such errors also may be the result of the vehicle suddenly experiencing unusual conditions (such as high headwinds), the effects of which are not immediately seen by the logic rules due to filtering techniques, which are necessary to filter out system noise. By way of example, assuming a 95-percent filter, the value of OS used by the logic will be 5-percent latest reading and 95-percent last OS value:

$$(OS_i=(0.05)(OS_{SENSED})+(0.95)(OS_{(i-1)}))$$

Figure 6:
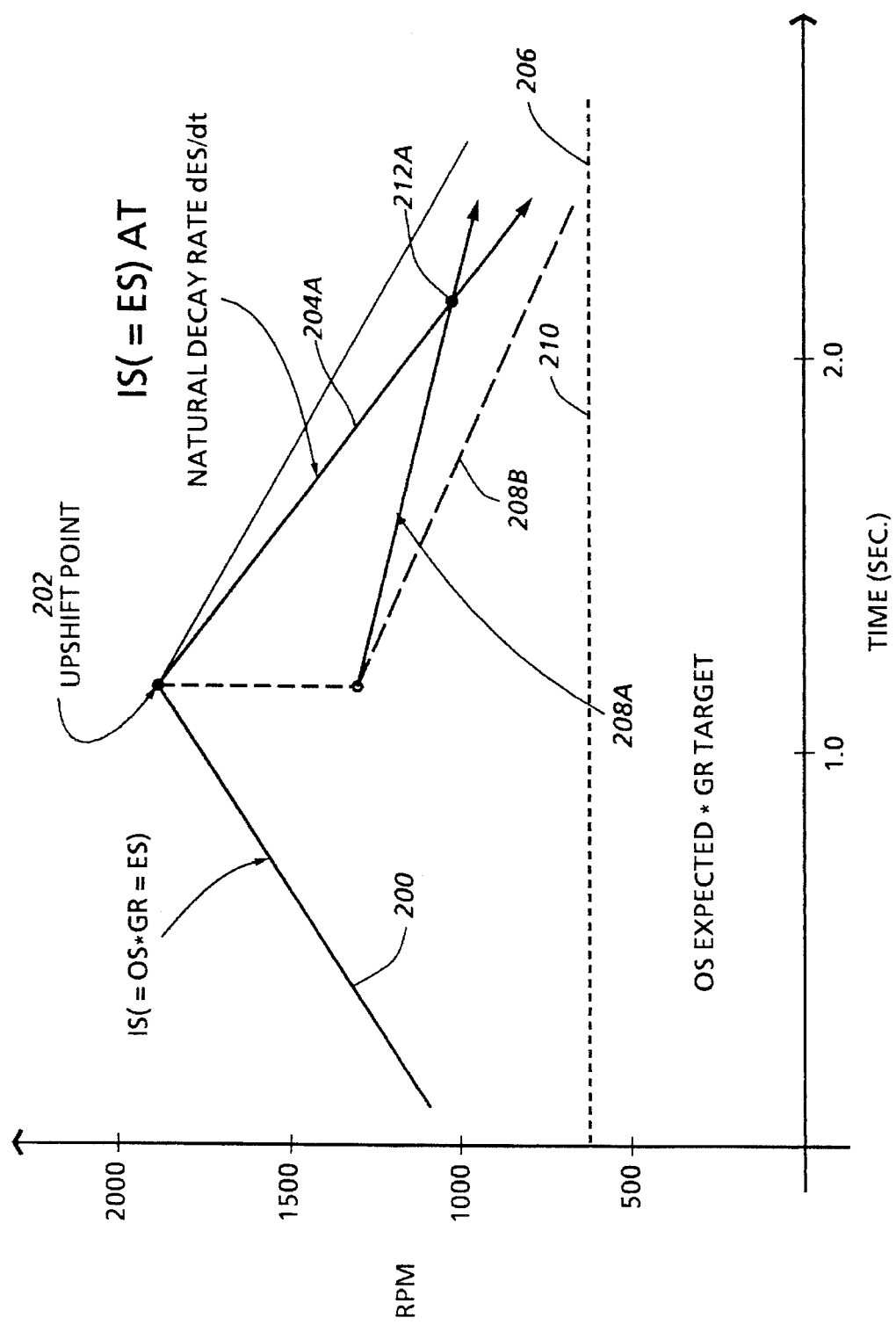
FIG. 6 is a graphical representation, similar to FIG. 5, of an attempted upshift event.

Referring to FIG. 6, if a selected upshift is deemed feasible, i.e., at point 212A, the line 204 (IS=ES) will intersect line 208A ($OS_{EXPECTED} * GR_{TARGET}$), and that upshift is not performed within a given period of time, the upshift is cancelled, the most reasonable gear ratio under existing vehicle conditions (often previously engaged ratio) is engaged, and the control logic rules by which upshift feasibility is determined are modified, at last temporarily, to be less aggressive in subsequent feasibility determination.

By way of examples, the decay rate, i.e. the deceleration of the engine, may be decreased by a given amount, which will shift line 204 to line 204A. Alternatively, the value of vehicle gross combined weight may be decreased by a given amount, which will shift line 208A to line 208B. Both examples will result in a less aggressive feasibility determination for subsequent selected upshifts.

Field experience with heavy-duty vehicles has been that a modification of about 6 percent, which may be compounded, if necessary, if a single modification does not eliminate the occurrence of missed upshifts determined to be feasible, provides an adaptive control which is both stable and responsive.

While permanent modifications to the upshift feasibility logic rules is possible, it is preferred that the modifications be temporary in nature and effective only for a predetermined time, predetermined number of shifts, or simply gradually decrease in effectiveness, as will occur in a filtering process as future sensed values of the control parameter variables are processed by the ECU.

Accordingly, it may be seen that a relatively simple and inexpensive shift implementation control system/method for automated mechanical transmission system 10, which automatically evaluates the feasibility, under current vehicle operating conditions, of successfully completing manually or automatically preselected upshifts and adaptively modifies the logic rules by which the feasibility of upshifts are evaluated in the event an upshift determined to be feasible is not successfully completed by the system, is provided.

Although the present invention has been described with a certain degree of particularity, it is understood that various changes to form and detail may be made without departing from the spirit and the scope of the invention as hereinafter claimed.

We claim:

1. An adaptive control system for controlling at least partially automated implementation of selected shifts of a vehicular mechanical change gear transmission system comprising a controlled fuel throttle controlled engine (E), a multi-speed change gear mechanical transmission (10) having an input shaft (16) and an output shaft (90) adapted to drive vehicular drive wheels, said input shaft having a determinable expected acceleration during an upshift into a target gear ratio, a master friction clutch (C) drivingly interposed between the engine and the input shaft, a first sensor (98) for providing a first input signal indicative of transmission input shaft (16) rotational speed, a second sensor (100) for providing a second input signal indicative of vehicle speed, a third sensor (DL/152) for providing an input signal indicative of engine torque and a transmission actuator (112, 70, 96) for controlling shifting of the transmission, said control system including means for:

determining selection of an upshift from a currently engaged transmission ratio to a target gear ratio;

determining as a first function of at least said input signals indicative of (i) current engine torque and (ii) current vehicle acceleration, an expected vehicle acceleration ($A_0$) under current vehicle operating conditions and at zero engine torque to the drive wheels;

determining as a second function of (i) the expected vehicle acceleration ($A_0$) under current vehicle operating conditions and at zero engine torque to the drive wheels, (ii) the gear ratio of the selected target gear ratio, and (iii) the expected input shaft acceleration during an upshift into the target gear ratio, feasibility or infeasibility of achieving substantially synchronous conditions for engagement of the target ratio if the selection of an upshift is implemented; and causing the initiation of a selected upshift only upon a determination of feasibility of achieving substantially synchronous conditions for engagement of the target gear ratio; and means effective, after initiation of a selected upshift and upon sensing failure to achieve substantially synchronous conditions for engagement of the target gear ratio, for modifying at least one of said first function and said second function to cause at least one of an increase in the expected input shaft acceleration during a gear ratio change operation and a decrease in the expected vehicle acceleration under current vehicle operating conditions and at zero engine torque to the drive wheels for subsequent selections of upshifts.

2. The system of claim 1 wherein expected vehicle deceleration under current vehicle operating conditions and at zero engine torque is also determined as a function of vehicle gross combined weight and said means for modifying modifies by decreasing the value of vehicle gross combined weight utilized in said first function by a predetermined amount.

3. The system of claim 2 wherein said predetermined amount is about 6 percent.

4. The system of claim 1 wherein the means for modifying at least one of said first and second functions causes a modification of about 6 percent.

5. The system of claim 1 wherein said means for modifying after modifying one of said first and second functions, causes said first and second functions to revert to original values thereof.

6. The system of claim 1 wherein said expected vehicle acceleration ($A_0$) is determined as a function of the expression $$A_1 - T_1/CW$$

where:

$A_1$ is a value representative of vehicle acceleration at a first torque value ($T_1$), $T_1$ is a known first torque value, W is a value representative of vehicle gross combined weight, and C is a constant.

7. The system of claim 6 wherein a value for the expression C·W is determined as a function of the expression $$(T_1 - T_2)/(A_1 - A_2)$$

where:

$A_2$ is a value representative of vehicle acceleration at a second torque value ($T_2$) and $T_2$ is a known second torque value where $T_2$ does not equal $T_1$.

8. An adaptive control method for controlling at least partially automated implementation of selected shifts of a vehicular mechanical change gear transmission system comprising a controlled fuel throttle controlled engine (E), a multi-speed change gear mechanical transmission (10) having an input shaft (16) and an output shaft (90) adapted to drive vehicular drive wheels, said input shaft having a determinable expected acceleration during an upshift into a target gear ratio, a master friction clutch (C) drivingly interposed between the engine and the input shaft, a first sensor (98) for providing a first input signal indicative of transmission input shaft (16) rotational speed, a second sensor (100) for providing a second input signal indicative of vehicle speed, a third sensor (DL/152) for providing an input signal indicative of engine torque and a transmission actuator (112, 70, 96) for controlling shifting of the transmission, said control method including the steps of:

determining selection of an upshift from a currently engaged transmission ratio to a target gear ratio;

determining as a first function of at least said input signals indicative of (i) current engine torque and (ii) current vehicle acceleration, an expected vehicle acceleration ($A_0$) under current vehicle operating conditions and at zero engine torque to the drive wheels;

determining as a second function of (i) the expected vehicle acceleration ($A_0$) under current vehicle operating conditions and at zero engine torque to the drive wheels, (ii) the gear ratio of the selected target gear ratio, and (iii) the expected input shaft acceleration during an upshift into the target gear ratio, feasibility or infeasibility of achieving substantially synchronous conditions for engagement of the target ratio if the selection of an upshift is implemented; and causing the initiation of a selected upshift only upon a determination of feasibility of achieving substantially, synchronous conditions for engagement of the target gear ratio; and after initiation of a selected upshift, upon sensing failure to achieve substantially synchronous conditions for engagement of the target gear ratio, modifying at least one of said first function and said second function to cause at least one of an increase in the expected input shaft acceleration during a gear ratio change operation and a decrease in the expected vehicle acceleration under current vehicle operating conditions and at zero engine torque to the drive wheels for subsequent selections of upshifts.

9. The method of claim 8 wherein expected vehicle deceleration under current vehicle operating conditions and at zero engine torque is also determined as a function of vehicle gross combined weight and said modification comprises decreasing the value of vehicle gross combined weight utilized in said first function by a predetermined amount.

10. The method of claim 9 wherein said predetermined amount is about 6 percent.

11. The method of claim 8 wherein the step of modifying at least one of said first and second functions results in a modification of about 6 percent.

12. The method of claim 8 further comprising the step of, after modifying one of said first and second functions, causing said first and second functions to revert to original values thereof.

13. The method of claim 8 wherein said expected vehicle acceleration ($A_0$) is determined as a function of the expression $$A_1 - T_1/CW$$

where:

$A_1$ is a value representative of vehicle acceleration at a first torque value ($T_1$), $T_1$ is a known first torque value, W is a value representative of vehicle gross combined weight, and C is a constant.

14. The method of claim 13 wherein a value for the expression C·W is determined as a function of the expression $$(T_1 - T_2)/(A_1 - A_2)$$

where:

$A_2$ is a value representative of vehicle acceleration at a second torque value ($T_2$) and $T_2$ is a known second torque value where $T_2$ does not equal $T_1$.

* * * * *